Oct. 25, 1932.    S. P. MILLER    1,884,088
FUME ARRESTER FOR CUPOLA FURNACES
Filed Dec. 29, 1930
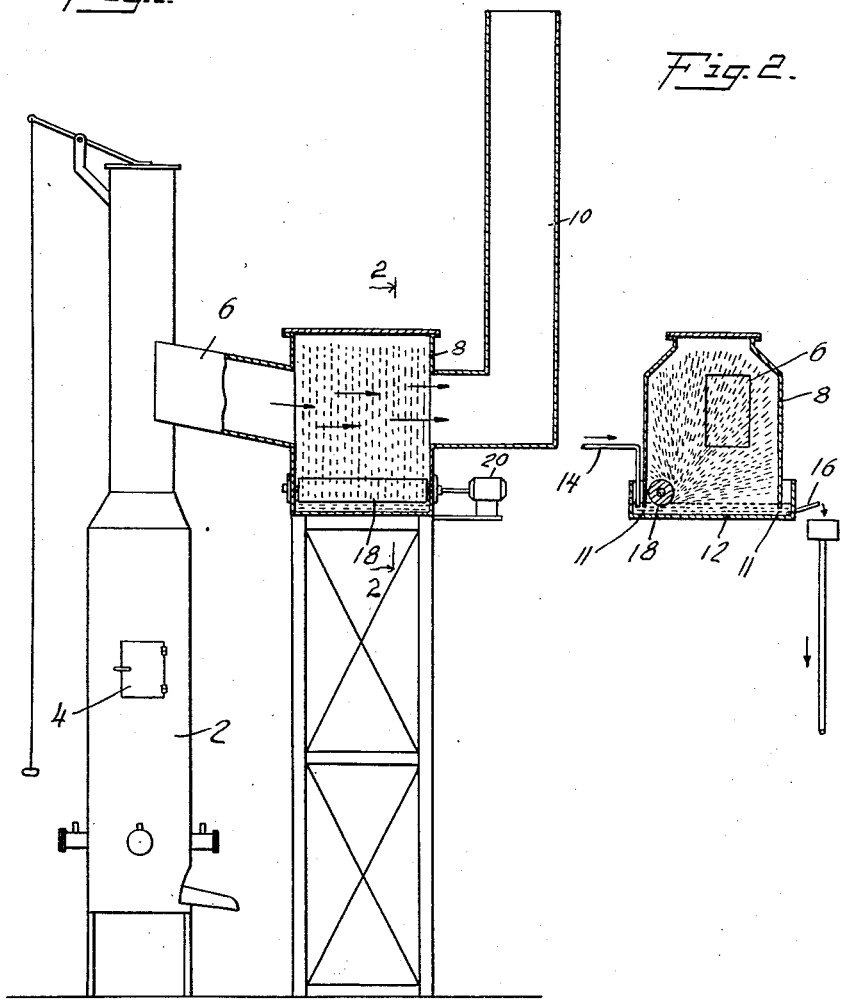
INVENTOR
Stuart Parmelee Miller
BY
ATTORNEY Patented Oct. 25, 1932

1,884,088

UNITED STATES PATENT OFFICE

STUART P. MILLER, OF ENGLEWOOD, NEW JERSEY, ASSIGNOR TO THE BARRETT COMPANY, OF NEW YORK, N. Y., A CORPORATION OF NEW JERSEY

FUME ARRESTER FOR CUPOLA FURNACES

Application filed December 29, 1930. Serial No. 505,305.

My invention relates to cupola furnaces and particularly to methods and means for eliminating or reducing the discharge of fumes into the atmosphere with the products of combustion produced in the furnace.

In the operation of cupola furnaces, substantial amounts of fumes consisting largely of metal vapor and metallic substances such as the sulfides and oxides of the metals being treated, are produced in the furnace. The production of these fumes is particularly pronounced when non-ferrous metals or alloys containing relatively volatile constituents are melted in cupola furnaces because of the tendency for the metal and metallic substances to volatilize. The fumes produced when non-ferrous metals such as lead, copper, zinc and alloys containing the same are melted in a cupola furnace are especially objectionable because of the fact that they are often poisonous or injurious to the health of the community or the operators in the plant where the furnace is employed. Heretofore these fumes have been discharged into the atmosphere with the products of combustion and have constituted a serious nuisance and menace to health particularly in cities and metropolitan areas.

The production and discharge of fumes into the atmosphere has always been accepted as a necessary incident to cupola furnace operation primarily because the use of fume arresters was economically impractical as applied to small furnaces such as cupola furnaces in which relatively small amounts of metal are treated. The use of smoke and fume arresters in power plants and large metallurgical installations where the cost of construction and operation is small per pound of metal produced or treated, is, of course, well known. However, so far as I am aware, fume arresters have never been employed in combination with cupola furnaces. Furthermore, the use of fume arresters for precipitating the fumes produced in treating metal in cupola furnaces presents a number of difficult problems due to the fact that the fumes produced are not readily precipitated by the use of packed towers and similar apparatus through which liquid is passed countercurrent to the flow of gases. Moreover, the resistance to the flow of gases presented by such devices tends to interfere with the operation of the furnace. Electrical precipitators such as those used in large installations are not suitable for use with cupola furnaces because of their excessive cost, the inability and aversion of furnace operators to handle and supervise the operation of high voltage electrical apparatus and the fact that the fumes which are sometimes poisonous are not fully precipitated and remain in gaseous phase.

In order to overcome the difficulties and danger thus presented in cupola furnace operation, I effect the precipitation of fumes from cupola furnaces in a form in which they are harmless and easily handled by passing the fumes and products of combustion through a chamber wherein they are subjected to the action of a dense uniform spray of liquid produced by rotating a member at high speed in contact with the surface of a body of liquid. The water is thus projected forcefully in a fine spray throughout the chamber in such a manner that the fumes carried with the products of combustion are effectively precipitated forming a sludge in the bottom of the chamber. The products of combustion freed from all or a substantial amount of the fumes are thus passed to the stack without imposing appreciable resistance to the flow of gases from the furnace to the stack. The cost of apparatus of this type is small and the expense and attention required for operating the device are negligible. I have found that the action of a spray produced in the manner described is particularly effective in precipitating the voluminous and often poisonous fumes resulting when non-ferrous metals or alloys such as bronzes are melted in cupola furnaces.

Among the objects of my invention are to prevent or reduce the discharge of fumes into the atmosphere with the products of combustion produced in cupola furnaces, to provide improved means for precipitating the fumes which are inexpensive to install and operate and which require a minimum of attention and to provide a process whereby fumes produced in a cupola furnace can be effectively precipitated without imposing difficulties upon the operation of the cupola furnace itself.

A specific object of my invention is to effect the precipitation of fumes produced in a cupola furnace by the action of a spray of liquid. These and other objects and features of my invention will appear from the following description thereof in which reference is made to the figures of the accompanying drawing wherein:

Fig. 1 is a side view partly in section illustrating one embodiment of my invention, and Fig. 2 is a vertical sectional view taken on the line 2—2 of Fig. 1.

In the form of the invention illustrated in the drawing, a cupola furnace 2 is provided with a charging door 4 through which the fuel and metal to be melted are introduced into the furnace. The upper portion of the furnace above the charging door is provided with a gas take-off 6 which extends substantially horizontally to a chamber 8 for conducting gases from the cupola furnace into the chamber. The opposite side of the chamber 8 is connected to the stack 10 through which the products of combustion are passed to the atmosphere.

The chamber 8 is provided with openings 11 adjacent the base 12 of the chamber 8 to provide a passage for water or other liquid used in effecting the precipitation of the fumes. The water is supplied to the chamber 8 through the pipe 14 and is maintained at a substantially constant level in the lower portion of the chamber by the overflow device 16. A member 18 is mounted for rotation in the chamber 8 with the lower portion of the member in contact with the upper surface of the water in the chamber. The member 18 is preferably in the form of a cylindrical roll provided on its surface with a perforated sheet or screen, or formed with convolutions or spaced discs for producing a dense uniform spray of fine particles of water, but, if desired, a roll having a smooth surface may be used. The member 18 is rotated at high speed by the motor 20 to project the water from its surface and distribute the same uniformly throughout the chamber.

I prefer to locate the member 18 with its axis of rotation substantially parallel with the conduit 6 so that the water thrown from its surface by centrifugal force is projected in a direction substantially transverse to that in which the fumes pass through the chamber 8 from the conduit 6 to the stack 10. As illustrated in Fig. 1, the conduit 6 is inclined slightly toward the chamber 8 so that any liquid that may enter the conduit will drain back into the chamber.

In operating the device illustrated in the drawing, the metal to be melted may be non-ferrous metal and the fuel employed may be any suitable fuel such as pitch coke which is characterized by its low content of sulfur and ash. This fuel has been found to be particularly suitable for use in the melting of non-ferrous metals in cupola furnaces.

The fume arrester is readily set in operation by turning on the water supplied thereto and energizing the motor to rotate the member 18. The overflow device maintains the water at the desired level so that the apparatus operates continuously and without further attention except to withdraw the sludge collected in the chamber 8.

The fumes produced in the furnace pass upwardly to the gas off-take 6 through which they pass substantially horizontally through the chamber 8 where they are subjected to the action of a dense uniform spray of water projected transversely thereto throughout the chamber. The gases and fumes entering the chamber 8 may be at temperatures of 700° C. or higher, and while in the chamber they are cooled to about 80° C. or 90° C. The volatile metallic substances which may be metal vapor or the oxides or sulfides of the metals being treated are thus cooled and the fumes are thoroughly drenched with water. The water apparently collects on the fumes as nuclei burdening the particles and causing agglomeration of the wet material into droplets too heavy to remain in suspension in the products of combustion. The wet particles are thereby precipitated from the products of combustion by the water spray and collect in the lower portion of the chamber 8 in the form of a sludge which may be readily withdrawn from the chamber from time to time or continuously. The products of combustion freed from the fumes then pass upwardly from the chamber 8 to the stack 10 and are discharged to the atmosphere. During operation, the water absorbs carbon dioxide and sulfur dioxide from the fumes and products of combustion and thus becomes acid in character.

It will be noted that the passage for the gases consisting of the gas off-take 6, the chamber 8 and the stack 10 is substantially unobstructed and therefore the gases are allowed to pass therethrough without imposing substantial resistance to the flow thereof. For this reason, the use of the fume arrester does not materially affect the conditions of draft maintained in operating the furnace.

Furthermore, although the fumes produced in cupola furnaces are of such a character that they are not readily precipitated by packed towers and other heretofore known fume arresters, I have found that the forceful and uniform projection of liquid through the fumes in the form of a fine spray is particularly effective in precipitating the fumes produced in cupola furnaces. The invention is equally applicable to the treatment of fumes produced when ferrous and non-ferrous metals and alloys such as bronzes are melted in cupola furnaces and when so used is of particular value in that the poisonous fumes and metallic materials ordinarily discharged into the air are removed from the products of combustion and collected as a sludge in which form they can be easily handled or discarded without danger to the health of the community or to the operators in the plant.

From the foregoing description of my invention, it will be apparent that the water may be supplied to the chamber 8 batchwise rather than continually, and the form of construction of the rotating member 18 may be varied considerably. For this reason, it is intended that the form of the invention shown in the drawing and herein described should be considered as illustrative and not as limiting the invention with respect to its form or method of operation.

I claim:

1. The combination comprising a cupola furnace, a stack and a chamber interposed between said furnace and stack through which fumes produced in the furnace are passed, said chamber containing water, means for maintaining the water in said chamber at a substantially constant level and a member positioned in said chamber and contacting with the water, said member being rotatable at high speed to produce a spray of water throughout the chamber.

2. The combination comprising a cupola furnace, a chamber, a conduit for conducting fumes and the products of combustion produced in the furnace into said chamber, a member rotatable at high speed about an axis substantially parallel with the conduit through which the gases are introduced into said chamber, and means for maintaining water in contact with the lower portion of said rotatable member to produce a spray of water throughout said chamber.

3. The combination comprising a cupola furnace, a horizontal conduit through which fumes and products of combustion produced in said furnace are passed, a chamber communicating with said conduit into which said fumes and gases are passed, means for maintaining a constant level of water within said chamber, a rotatable cylinder positioned with its axis of rotation substantially parallel to said conduit and with the lower portion of said cylinder in contact with the water in said chamber, means for rotating said cylinder at high speed to produce a spray of water throughout said chamber and a stack communicating with said chamber through which the products of combustion from which the fumes have been precipitated, are passed.

4. The process which comprises melting non-ferrous metal in a cupola furnace, conducting the products of combustion and the fumes produced by the melting of the metal from said furnace in a substantially horizontal path into a chamber, maintaining water in said chamber at a substantially constant level, producing a spray of water by the rotation of a member in contact with the water contained in said chamber, whereby constituents of the fumes are precipitated, and removing the products of combustion from said chamber.

5. The process which comprises melting metal in a cupola furnace, passing the resulting fumes and products of combustion containing metal vapors and noxious gases from said furnace through a chamber, maintaining a body of water in said chamber and producing a dense uniform spray of finely divided particles of water in said chamber by rotating a member in contact with said water whereby constituents of said fumes are precipitated, and removing the products of combustion from said chamber.

6. In combination, a cupola furnace, a stack, and a chamber interposed between said furnace and said stack, through which fumes produced in said furnace are passed to said stack, said chamber comprising means for maintaining a substantially constant level of liquid therein, and means contacting with said liquid to produce a spray of liquid throughout the chamber through which the fumes pass in their passage through said chamber.

7. The process of preventing the discharge of fumes into the atmosphere produced in the melting and refining of metals in a cupola furnace, which comprises passing products of combustion and fumes produced in the melting of the metals to a stack through a path which is substantially unobstructed except for a finely divided spray of liquid disposed at a localized point across the path of movement of the products of combustion and fumes from the cupola to the stack, thereby precipitating the fumes.

In witness whereof I hereunto set my hand.

STUART P. MILLER.